United States Patent
Arpin

(10) Patent No.: US 10,164,269 B2
(45) Date of Patent: Dec. 25, 2018

(54) BORON PHOSPHATE MATRIX LAYER

(71) Applicant: DOOSAN FUEL CELL AMERICA, INC., South Windsor, CT (US)

(72) Inventor: Kevin A. Arpin, Coventry, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 118 days.

(21) Appl. No.: 15/244,328

(22) Filed: Aug. 23, 2016

(65) Prior Publication Data

US 2018/0062184 A1 Mar. 1, 2018

(51) Int. Cl.
*H01M 8/0293* (2016.01)
*H01M 8/086* (2016.01)

(52) U.S. Cl.
CPC ......... *H01M 8/0293* (2013.01); *H01M 8/086* (2013.01)

(58) Field of Classification Search
None
See application file for complete search history.

(56) References Cited

U.S. PATENT DOCUMENTS

| | | | |
|---|---|---|---|
| 3,375,138 A | 3/1968 | Mather, Jr. | |
| 3,453,149 A | 7/1969 | Adlhart et al. | |
| 3,867,206 A | 2/1975 | Trocciola et al. | |
| 4,017,664 A | 4/1977 | Breault | |
| 4,365,008 A | 12/1982 | DeCasperis et al. | |
| 4,622,276 A | 11/1986 | Walsh | |
| 4,687,715 A | 8/1987 | Michael | |
| 4,786,568 A | 11/1988 | Elmore et al. | |
| 5,300,124 A | 4/1994 | Breault et al. | |
| 6,716,548 B1 | 4/2004 | Kaliaguine et al. | |
| 7,718,304 B2 | 5/2010 | Kang | |
| 7,993,791 B2 | 8/2011 | Zhamu et al. | |
| 8,507,147 B2 | 8/2013 | Mofakhami | |
| 2006/0127727 A1 | 6/2006 | Lee et al. | |
| 2006/0141316 A1* | 6/2006 | Kang | H01M 8/1016 429/482 |
| 2009/0233144 A1 | 9/2009 | Cho et al. | |

FOREIGN PATENT DOCUMENTS

| | | |
|---|---|---|
| DE | 102014100702 A1 | 7/2015 |
| EP | 0306567 A1 | 3/1989 |
| JP | H05190185 A | 7/1993 |
| JP | 2007035301 A | 2/2007 |

(Continued)

OTHER PUBLICATIONS

Mamlouk, et al., "A Boron Phosphate-Phosphoric Acid Composite Membrane for Medium Temperature Proton Exchange Membrane Fuel Cells," Journal of Power Sources 286 (2015) 290-298; http://dx.doi.org/10.1016/j.jpowsour.2015.03/169.

(Continued)

*Primary Examiner* — Sarah A. Slifka
*Assistant Examiner* — Haroon S. Sheikh
(74) *Attorney, Agent, or Firm* — Carlson, Gaskey & Olds

(57) ABSTRACT

An illustrative example embodiment of a fuel cell includes a cathode electrode, an anode electrode, and a porous matrix layer between the electrodes. The porous matrix layer includes pores and solids. The solids comprises at least 90% boron phosphate. A phosphoric acid electrolyte is within the pores of the matrix layer.

20 Claims, 1 Drawing Sheet

(56) References Cited

FOREIGN PATENT DOCUMENTS

KR        1020080085484 A        9/2008

OTHER PUBLICATIONS

Lan, et al., "A Fuel Cell Operating Between Room Temperature and 250° C Based on a New Phosphoric Acid Based Composite Electrolyte," Journal of Power Sources 195 (2010) 6983-6987.

Lan, Rong et al., "A fuel cell operating between room temperature and 250° C based on a new phosphoric acid based composite electrolyte", Journal of Power Sources, 2010, vol. 195, No. 20, pp. 6983-6987.

International Search Report and the Written Opinion of the International Searching Authority for International application No. PCT/US2017/047738 dated Jan. 26, 2018.

* cited by examiner

BORON PHOSPHATE MATRIX LAYER

BACKGROUND

Fuel cells are useful for generating electrical energy based on an electrochemical reaction. Different types of fuel cells have been developed. Phosphoric acid fuel cells (PAFCs) utilize a phosphoric acid electrolyte between cathode and anode electrodes. Polymer electrolyte membrane (PEM) fuel cells utilize a polymer electrolyte between the electrodes. Each type of fuel cell has its own characteristics, which may make it more suitable for a particular application.

In PAFCs, the phosphoric acid electrolyte is retained in a matrix that is situated between the electrodes. Different materials have been used for the matrix layer. U.S. Pat. No. 3,694,310 describes a phenolic resin matrix layer. One drawback associated with phenolic resin matrix layers is that over time a reaction between the phosphoric acid and the organic material of the matrix layer at elevated temperatures produces a molecule that adsorbs onto the electrode catalyst and poisons the catalyst. As a result, the performance of the fuel cell degrades.

U.S. Pat. No. 4,017,664 describes a matrix layer made of silicon carbide. One drawback associated with such a matrix layer is that the oxide on silicon carbide slowly dissolves during typical fuel cell operating conditions and converts to silicon phosphate, which is insoluble in phosphoric acid. This causes an associated loss of phosphoric acid electrolyte and the insoluble phosphate material could potentially block fuel or oxidant gas delivery to the electrodes.

It would be useful to have a PAFC matrix layer with improved characteristics compared to previously proposed or used matrix layers.

SUMMARY

An illustrative example embodiment of a fuel cell includes a cathode electrode, an anode electrode, and a porous matrix layer between the electrodes. The matrix layer comprises pores and solids. The solids of the matrix layer comprise at least 90% boron phosphate. A phosphoric acid electrolyte is within the pores of the matrix layer.

In an example embodiment having one or more features of the fuel cell of the previous paragraph, the boron phosphate has an average particle size between 0.5 µm and 4 µm.

In an example embodiment having one or more features of the fuel cell of either of the previous paragraphs, the average particle size is approximately 2 µm.

In an example embodiment having one or more features of the fuel cell of any of the previous paragraphs, the matrix layer has a thickness that is between 10 µm and 100 µm.

In an example embodiment having one or more features of the fuel cell of any of the previous paragraphs, the thickness is approximately 50 µm.

In an example embodiment having one or more features of the fuel cell of any of the previous paragraphs, the solids of the matrix layer comprises between 90% and 99% boron phosphate.

In an example embodiment having one or more features of the fuel cell of any of the previous paragraphs, the matrix layer comprises a coating on at least one of the electrodes.

In an example embodiment having one or more features of the fuel cell of any of the previous paragraphs, the cathode electrode and the anode electrode each comprise a catalyst layer, each catalyst layer is surrounded by a filler band layer, and each filler band layer comprises boron phosphate.

In an example embodiment having one or more features of the fuel cell of any of the previous paragraphs, the filler band layers have a different composition than the matrix layer.

In an example embodiment having one or more features of the fuel cell of any of the previous paragraphs, the anode electrode and the cathode electrode are supported on respective substrate layers, the respective substrate layers comprise an edge seal, and the respective edge seals comprise boron phosphate.

An illustrative example embodiment of a method of making a fuel cell includes establishing a cathode layer; establishing an anode layer; establishing a porous matrix layer between the cathode layer and the anode layer, wherein the matrix layer comprises pores and solids with the solids comprising at least 90% boron phosphate; and disposing phosphoric acid electrolyte in the pores of the matrix layer.

In an example embodiment having one or more features of the method of the previous paragraph, establishing the matrix layer comprises mixing a slurry comprising boron phosphate particles, a surfactant, a thickening agent, and a binder; depositing a coating of the mixed slurry on at least one of the cathode layer or the anode layer; and drying the deposited coating, wherein the resulting coating is at least part of the matrix layer.

An example embodiment having one or more features of the method of either of the previous paragraphs includes depositing a coating of the mixed slurry on each of the cathode layer and the anode layer and the deposited coatings collectively establish the matrix layer.

In an example embodiment having one or more features of the method of any of the previous paragraphs, the boron phosphate particles have an average particle size between 0.5 µm and 4 µm.

In an example embodiment having one or more features of the method of any of the previous paragraphs, the average particle size is approximately 2 µm.

In an example embodiment having one or more features of the method of any of the previous paragraphs, the matrix layer has a thickness that is between 10 µm and 100 µm.

In an example embodiment having one or more features of the method of any of the previous paragraphs, the thickness is approximately 50 µm.

In an example embodiment having one or more features of the method of any of the previous paragraphs, the solids of the matrix layer comprises between 90% and 99% boron phosphate.

An example embodiment having one or more features of the method of any of the previous paragraphs includes surrounding the cathode layer and the anode layer respectively with a filler band layer that comprises boron phosphate.

An example embodiment having one or more features of the method of any of the previous paragraphs includes establishing the cathode layer on a first substrate layer, establishing the anode layer on a second substrate layer, providing a first edge seal on the first substrate layer, and providing a second edge seal on the second substrate layer. The first and second edge seals comprise boron phosphate.

Various features and advantages of at least one disclosed example embodiment will become apparent to those skilled in the art from the following detailed description. The drawings that accompany the detailed description can be briefly described as follows.

DETAILED DESCRIPTION

Figure 1:
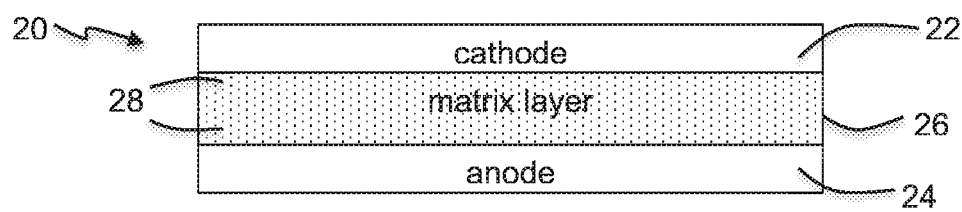
FIG. 1 schematically illustrates selected portions of a fuel cell designed according to an embodiment of this invention.

FIG. 1 schematically illustrates selected portions of a fuel cell 20. A cathode electrode 22 and an anode electrode 24 are separated by a porous matrix layer 26 that is disposed between the cathode 22 and the anode 24. The porous matrix layer 26 includes solids and pores. The solids of the matrix layer 26 comprise boron phosphate. In some examples, the solids of the matrix layer 26 comprise at least 90% boron phosphate. One example embodiment includes the solids of the matrix layer 26 comprising up to 99% boron phosphate.

If, for example, one were to consider the volume occupied by the matrix layer 26, some of that volume will be occupied by the pores of the matrix layer 26. In some embodiments the pores occupy at least approximately 40% of the volume. The remaining portion of the volume that is not occupied by the pores will be occupied by solids of the matrix layer and those solids comprise at least 90% boron phosphate.

The pores of the matrix layer 26 contain a phosphoric acid electrolyte schematically represented at 28, which serves as the electrolyte for facilitating the electrochemical reaction by which the fuel cell 20 generates electricity.

Utilizing boron phosphate for the matrix layer 26 provides the ability to retain the phosphoric acid electrolyte 28 between the electrodes where it is needed during fuel cell operation and prevent the reactants from the respective electrodes from mixing (i.e., sufficient bubble pressure). The porous matrix layer 26 has good liquid permeability, is wettable to the phosphoric acid electrolyte, is electrically insulating at least to a sufficient degree for facilitating fuel cell operation, is chemically stable in the presence of the phosphoric acid electrolyte, and allows for making the matrix layer 26 thin enough to minimize IR losses.

One feature of the matrix layer 26 is that it can include boron phosphate particles that are small enough to realize a thinner matrix layer compared to matrix layers made with other materials. In some examples, the boron phosphate particles have an average particle size between 0.5 μm and 4 μm with a maximum particle size of approximately 10 μm (e.g., D100=10 μm). In the illustrated example, the average particle size is approximately 1 μm. This description uses the term "approximately" in this context to encompass variations from a particle size that is exactly 1 μm. For example, the phrase "approximately 1 μm" should be understood to include an average particle size that is between 0.5 μm and 1.5 μm. Other embodiments may have different average or maximum particle sizes.

The matrix layer 26 comprising boron phosphate may be as thin as 10 μm. Example embodiments include a matrix layer thickness that is between 10 μm and 100 μm. One example embodiment includes a matrix layer 26 having a thickness that is approximately 50 μm. The term "approximately" in this context should be understood to encompass variations from the exact dimension of 50 μm and include, for example, between 40 μm and 60 μm. Having a thinner matrix layers reduces IR losses and provides better fuel cell efficiency.

Using boron phosphate allows for having smaller particle size and a resulting thinner matrix layer. The smaller particle size compared to previous matrix layer materials such as silicon carbide, also allows for an increased bubble pressure, which also enhances fuel cell operation and lifetime.

It is not possible to use silicon carbide particles as small as the boron phosphate particles of the illustrated embodiments, in part, because smaller silicon carbide particles provide more surface area and more oxide that can be attacked by the phosphoric acid electrolyte resulting in more of the undesirable insoluble silicon phosphate mentioned above, reduced acid inventory in the fuel cell, and reduced fuel cell lifetime.

Reducing losses by having a thinner matrix layer also allows for lowering platinum loadings in the electrodes without sacrificing power. Given that platinum is an expensive material, a matrix layer 26 designed according to an embodiment of this invention provides cost advantages not only for the matrix layer itself but for other portions of the fuel cell. Reducing cost is a significant challenge faced within the fuel cell industry.

Figure 2:
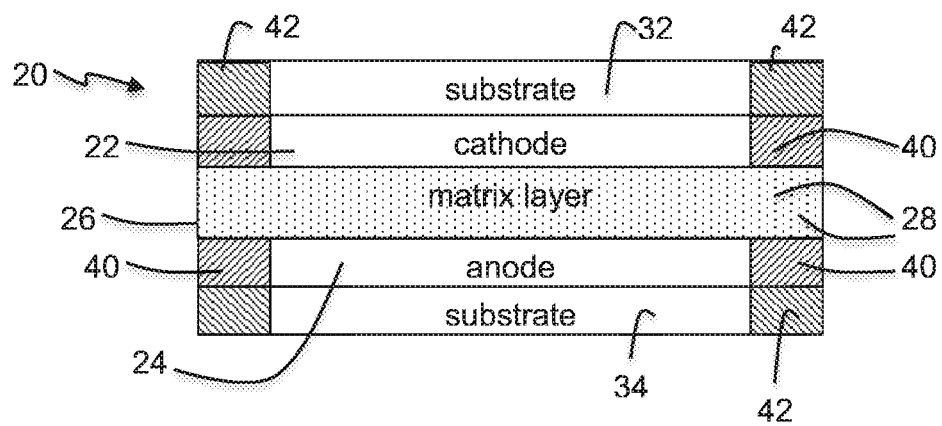
FIG. 2 schematically illustrates selected portions of another example embodiment of a fuel cell.

FIG. 2 illustrates another example fuel cell configuration. The cathode layer 22 is supported on a first substrate layer 32 and the anode layer 24 is supported on a second substrate layer 34. A filler band layer 40 surrounds the respective electrode layers 22 and 24. An example embodiment has a picture-frame-type configuration of the filler band layer 40. In this example, the filler band layer 40 is porous and the solids of the filler band layer comprise at least 90% boron phosphate. In some examples, the filler band layer 40 is at least approximately 40% porous.

The size of the boron phosphate particles in the filler band layer 40 may be different than the size of the boron phosphate particles in the matrix layer 26. In one embodiment, the average particle size of boron phosphate in the filler band is between 0.5 um and 10 um. In some examples, the filler band layers 40 include a binder material, such as a fluoropolymer. Additionally, the filler band layer 40 may have other components so that the composition of the filler band layer 40 is different than the composition of the matrix layer 26 even though both include boron phosphate.

The substrate layers 32 and 34 include an edge seal along an edge of the substrate layers, respectively. The edge seals 42 in the illustrated example comprise boron phosphate particles impregnated within the pores of the substrate. The size of the boron phosphate particles in the edge seals 42 may be different than the size of particles used in the matrix layer 26 and in the filler band layer 40, respectively. In one embodiment, the average particle size of boron phosphate in the edge seal is between 0.1 um and 4 um. Additionally, the composition of the edge seals 42 may be different than the composition of the filler band layers 40.

Utilizing boron phosphate as the material for the matrix layer 26, the filler band layers 40 and the edge seals 42 may present efficiencies during a process of making a fuel cell arrangement such as that shown in FIG. 2.

An embodiment of a method of making a fuel cell includes establishing a cathode layer 22 and establishing an anode layer 24. The method includes establishing the matrix layer 26 between the cathode layer and the anode layer with the matrix layer comprising at least 90% boron phosphate. Phosphoric acid 28 is disposed in the matrix layer 26 as the electrolyte.

Establishing the matrix layer in an example embodiment includes mixing a slurry containing boron phosphate particles, a surfactant, a thickening agent, and a binder. One example slurry composition includes approximately 55% boron phosphate powder, 0.4% of a surfactant such as surfynol 104E, 0.06% rhodopol 23, 0.8% of an aqueous FEP dispersion as the binder such as chemours D121 with the remaining approximately 43% being distilled water. The additives chosen and their approximate ratios can be tailored for different deposition methods. Given this description, those skilled in the art will be able to determine appropriate ratios for their particular situation.

In some examples, the boron phosphate powder may be milled to achieve a desired average particle size.

The mixed slurry may be applied to the anode electrode, cathode electrode, or both. Example techniques for depositing a coating of the mixed slurry on at least one of the cathode or anode layers may include a tape casting, spray coating, gravure coating, curtain coating, screen printing, transfer printing, doctor blading, die casting or a comparable process.

The deposited coating is dried resulting in a boron phosphate matrix layer of a desired thickness. In some examples, each of the electrode layers are coated with a portion of the matrix layer having approximately one-half of the total thickness of the matrix layer when the electrodes are situated relative to each other as schematically shown in FIGS. 1 and 2.

A fuel cell matrix layer made with boron phosphate consistent with the above description allows for achieving enhanced fuel cell efficiency, increased product lifetime, and reduced fuel cell cost.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell, comprising:
   a cathode electrode;
   an anode electrode;
   a porous matrix layer between the cathode electrode and the anode electrode, the porous matrix layer including pores and solids, the solids of the porous matrix layer comprising at least 90% boron phosphate by mass; and
   a phosphoric acid electrolyte within the pores of the matrix layer.

2. The fuel cell of claim 1, wherein
   the boron phosphate has an average particle size between 0.5 µm and 4 µm.

3. The fuel cell of claim 2, wherein the average particle size is approximately 2 µm.

4. The fuel cell of claim 1, wherein
   the matrix layer has a thickness that is between 10 µm and 100 µm.

5. The fuel cell of claim 3, wherein the thickness is approximately 50 µm.

6. The fuel cell of claim 1, wherein the solids comprise between 90% and 99% boron phosphate by mass.

7. The fuel cell of claim 1, wherein the matrix layer comprises a coating on at least one of the electrodes.

8. The fuel cell of claim 1, wherein
   the cathode electrode and the anode electrode each comprises a catalyst layer;
   each catalyst layer is surrounded by a porous filler band layer; and
   each porous filler band layer comprises boron phosphate.

9. The fuel cell of claim 8, wherein the filler band layers have a different composition than the matrix layer.

10. The fuel cell of claim 1, wherein
    the anode electrode and the cathode electrode are supported on respective substrate layers;
    the respective substrate layers comprise an edge seal; and
    the respective edge seals comprise boron phosphate.

11. A method of making a fuel cell, the method comprising:
    establishing a cathode layer;
    establishing an anode layer;
    establishing a porous matrix layer between the cathode layer and the anode layer, the porous matrix layer including pores and solids, the solids comprising at least 90% boron phosphate by mass; and
    disposing phosphoric acid electrolyte in the pores of the porous matrix layer.

12. The method of claim 11, wherein establishing the porous matrix layer comprises
    mixing a slurry comprising boron phosphate particles, a surfactant, a thickening agent, and a binder;
    depositing a coating of the mixed slurry on at least one of the cathode layer or the anode layer; and
    drying the deposited coating, wherein the resulting coating is at least part of the matrix layer.

13. The method of claim 12, comprising
    depositing the coating of the mixed slurry on each of the cathode layer and the anode layer; and
    wherein the deposited coatings collectively establish the matrix layer.

14. The method of claim 12, wherein
    the boron phosphate particles have an average particle size between 0.5 µm and 4 µm.

15. The method of claim 14, wherein the average particle size is approximately 2 µm.

16. The method of claim 11, wherein
    the matrix layer has a thickness that is between 10 µm and 100 µm.

17. The method of claim 16, wherein the thickness is approximately 50 µm.

18. The method of claim 11, wherein the solids comprise between 90% and 99% boron phosphate by mass.

19. The method of claim 11, comprising surrounding the cathode layer and the anode layer respectively with a filler band layer that comprises boron phosphate.

20. The method of claim 11, comprising
    establishing the cathode layer on a first substrate layer;
    establishing the anode layer on a second substrate layer;
    providing a first edge seal on the first substrate layer; and
    providing a second edge seal on the second substrate layer,
    wherein the first and second edge seals comprise boron phosphate.

* * * * *